(12) United States Patent
Green et al.

(10) Patent No.: US 9,669,310 B2
(45) Date of Patent: Jun. 6, 2017

(54) GAMING ASSISTANCE SYSTEM AND METHOD

(71) Applicant: Sony Computer Entertainment Europe Limited, London (GB)

(72) Inventors: Mark Denzil Green, London (GB); Douglas Ralph Ealey, Southampton (GB)

(73) Assignee: Sony Computer Entertainment Europe Limited (GB)

( * ) Notice: Subject to any disclaimer, the term of this patent is extended or adjusted under 35 U.S.C. 154(b) by 136 days.

(21) Appl. No.: 13/628,279

(22) Filed: Sep. 27, 2012

(65) Prior Publication Data
US 2013/0084985 A1    Apr. 4, 2013

(30) Foreign Application Priority Data

Sep. 29, 2011  (EP) .................................... 11183258

(51) Int. Cl.
*A63F 9/24*     (2006.01)
*A63F 13/493*   (2014.01)
(Continued)

(52) U.S. Cl.
CPC ............... *A63F 13/493* (2014.09); *A63F 9/24* (2013.01); *A63F 13/10* (2013.01); *A63F 13/35* (2014.09);
(Continued)

(58) Field of Classification Search
CPC .......... A63F 13/00; A63F 13/10; A63F 13/12; A63F 2300/55; A63F 2300/5546;
(Continued)

(56) References Cited

U.S. PATENT DOCUMENTS 8,007,362 B2     8/2011  Aoyama et al.
2005/0251531 A1  11/2005 Jen et al.
(Continued)

FOREIGN PATENT DOCUMENTS

WO    2009113054 A1    9/2009

OTHER PUBLICATIONS

Extended European Search Report and Search Opinion for Application No. EP11183258, dated Apr. 10, 2012.
(Continued)

*Primary Examiner* — William H McCulloch, Jr.
*Assistant Examiner* — Chase Leichliter
(74) *Attorney, Agent, or Firm* — Lerner, David, Littenberg, Krumholz & Mentlik, LLP

(57) ABSTRACT

A method of assisting a first player of a videogame is provided. The method includes making a game state of the first player accessible to a second player. The game state describes a state of the videogame as played by the first player. The method also includes executing the videogame for the second player using the game state of the first player to define the initial state of the videogame for the second player, allowing the second player to play the videogame based upon the game state of the first player until a first predetermined criterion is met, and providing to the first player data for updating their game state in response to the play of the second player.

14 Claims, 5 Drawing Sheets

(51) Int. Cl.
 *A63F 13/40*    (2014.01)
 *A63F 13/35*    (2014.01)
 *A63F 13/63*    (2014.01)
 *A63F 13/86*    (2014.01)
 *A63F 13/34*    (2014.01)
 *A63F 13/795*    (2014.01)
 *A63F 13/85*    (2014.01)
 *A63F 13/00*    (2014.01)
 *A63F 13/30*    (2014.01)

(52) U.S. Cl.
 CPC .............. *A63F 13/63* (2014.09); *A63F 13/86* (2014.09); *A63F 13/00* (2013.01); *A63F 13/12* (2013.01); *A63F 13/34* (2014.09); *A63F 13/795* (2014.09); *A63F 13/85* (2014.09); *A63F 2300/554* (2013.01); *A63F 2300/577* (2013.01); *A63F 2300/636* (2013.01)

(58) Field of Classification Search
 CPC ............ A63F 2300/57; A63F 2300/577; A63F 2300/60; A63F 2300/6027; A63F 13/06; A63F 2300/00; A63F 2300/10; A63F 2300/30; A63F 2300/305; A63F 2300/40; A63F 2300/407; A63F 2300/63; A63F 2300/65; A63F 13/34; A63F 13/85; A63F 13/795
 USPC .......................... 463/1, 42, 43, 31, 30, 36–38
 See application file for complete search history.

(56) References Cited

U.S. PATENT DOCUMENTS

| | | | | |
|---|---|---|---|---|
| 2007/0191103 | A1* | 8/2007 | Van Luchene | 463/42 |
| 2007/0191104 | A1* | 8/2007 | Van Luchene | 463/42 |
| 2007/0293319 | A1 | 12/2007 | Stamper et al. | |
| 2008/0004117 | A1* | 1/2008 | Stamper et al. | 463/42 |
| 2009/0118016 | A1* | 5/2009 | Ben-Artzi et al. | 463/42 |
| 2010/0094900 | A1* | 4/2010 | Hughes, Jr. | G06F 17/3002 707/770 |
| 2010/0160038 | A1* | 6/2010 | Youm et al. | 463/29 |

OTHER PUBLICATIONS

Internet forum operated by escapistmagazine: "Poll : Do you enjoy watching video games being played?", URL:http://www.escapistmagazine.comjforums/read/9.311295-Poll-Do-you-enjoy-watchingvideo-games-being-played, Sep. 6, 2011, XP002664470.
Nathan Brown, "GDC 2011: Minecraft Mod Wins Game Design Challenge", URL:http://www.next-gen.bizjnewsjgdc-2011-minecraft-mod-wins-game-design-challenge, Mar. 8, 2011, XP002664471.
Wikipedia: "Cooperative gameplay", wikipedia.org, URL:http://en.wikipedia.orgjw/index.php?title=Cooperative gameplay &oldid=452899586, Sep. 28, 2011, XP002672186.
Wikipedia: "FarmVille", wikipedia.org, URL:http://en.wikipedia.orgjw/index.php?title=FarmVille&oldid=451365820, Sep. 19, 2011, XP002672185.
Partial European Search Report for Application No. EP11183258 dated Jan. 13, 2012.
"Team Viewer—Wikipedia", Sep. 24, 2011 (Sep. 24, 2011), XP055170773, Retrieved from the Internet: <http://en.wikipedia.org/w/index.php?title=TeamViewer&oldid=452119693>.
Amir Rezaei: "Is it possible to run games over remote desktop?",Oct. 9, 2010 (Oct. 9, 2010), XP055170772, Retrieved from the Internet: <http://superuser.com/questions/209023/is-it-possible-to-run-games-over-remote-desktop>.
Extended European Search Report for Application No. 14191174.3 dated Feb. 26, 2015.
Internet Forum Operated by Escapistmagazine: "Poll: Do you enjoy watching video games being played?", Internet Citation, Sep. 6, 2011 (Sep. 6, 2011), pp. 1-6, XP002664470, Retrieved from the Internet:<http://www.escapistmagazine.com/forums/read/9.311295-Poll-Do-you-enjoy-watching-video-games-being-played>.

* cited by examiner

GAMING ASSISTANCE SYSTEM AND METHOD

CROSS REFERENCE TO RELATED APPLICATIONS

The present application claims the benefit of and priority to EP Application No. 11183258.0, filed Sep. 29, 2011, the entire disclosure of which is incorporated by reference herein.

BACKGROUND OF THE INVENTION

Field of the Invention

The present invention relates to a game assistance system and method.

Description of the Prior Art

Conventional games occasionally provide co-operative multi-player modes in which players may assist each other to complete a task with their respective in-game avatars (virtual representations within a game environment). Examples of such games include Portal 2® multiplayer mode, or some parts of Little Big Planet®. Such modes require typically two separate players to work together to achieve a goal.

By contrast, in single-player game modes, the purpose of the game is to provide a challenge to the individual player within the game world, and it is up to this player to achieve in-game goals themselves. However, on occasion the game may provide a challenge that requires more skill than the player possesses.

Conventionally, to accommodate this scenario single player games provide difficulty settings, and usually provide at least one setting that is easier than a default or 'normal' setting, giving the player a chance to progress. For complex or non-obvious solutions to problems within a game, players may also refer to so-called 'walk-throughs' online, where other players recount their own progress through the game, either as a text document or as a series of videos. However, these solutions may be unsatisfactory, particularly if the user still cannot overcome a particular challenge.

The present invention seeks to address or mitigate the above problem.

SUMMARY OF THE INVENTION

In a first aspect, a method of assisting a first player of a videogame is provided as recited in claim 1.

In another aspect, an entertainment device for playing a videogame by a first player is provided as recited in claim 12.

In another aspect, an entertainment device for playing a videogame by a second player is provided as recited in claim 13.

In yet another aspect, a cloud gaming server is provided as recited in claim 14.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DETAILED DESCRIPTION

A game assistance system and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In a summary embodiment of the present invention, a game assistance system allows a first player who is stuck in a difficult part of a game to contact a friend and ask them to play the first player's game for them, in order to get past the difficult part. If the friend has their own copy of the game, then upon accepting this request a specially formatted game save is sent to the friend that replicates the first player's game state. The friend can then play the difficult part as if they were the first player, and upon completion of the difficult part of the game a specially formatted updated game save is sent back to the first player. The friend's own progress through their own playing of the game is unaffected by this. In one instance, the specially formatted updated game save contains a record of the friend's in-game actions that, in conjunction with the first player's game state, enables a live recreation of the friend's in-game actions for the first player to see in their instance of the game. In this way, the friend has played as the first player, for the first player, to overcome the in-game difficulty. This has the advantage of overcoming the in-game difficulty whilst otherwise preserving the first player's game state. Moreover, because during the recreation the game is being played using recorded actions, the first player can at any point take over control of the game themselves, so that they can resume play from the moment they feel they can continue the game themselves.

Figure 1:
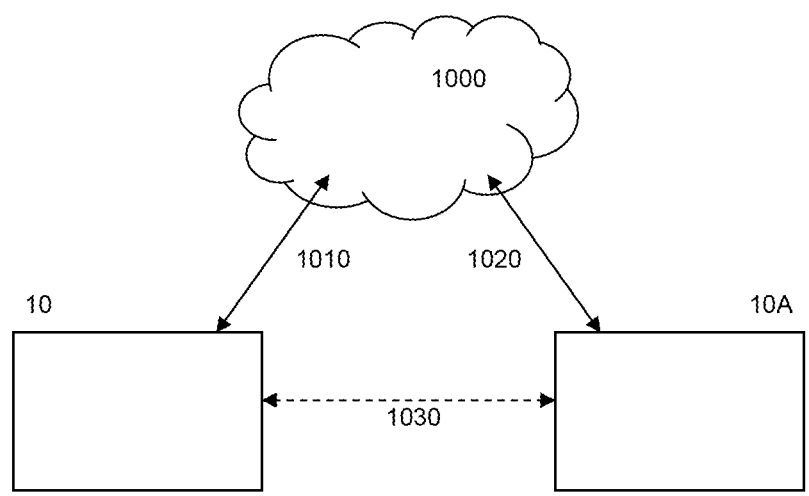
FIG. 1 is a schematic diagram of two networked entertainment devices according to an embodiment of the present invention.

Referring now to FIG. 1, in an embodiment of the present invention a first player has a first entertainment device 10, and a second player has a second entertainment device 10A. These devices may be connected to a private network such as the PlayStation® Network (PSN) 1000 via internet links (1010, 1020). Alternatively or in addition they may be connected over the internet via a peer-to-peer link 1030.

The entertainment device is typically a PC or a games console, such as a Sony® PlayStation 3® (PS3), PlayStation Portable® (PSP) or PlayStation Vita® (PSV), but as explained later herein may be a web-enabled television, digital TV receiver box or other web-enabled display device.

Figure 2A:
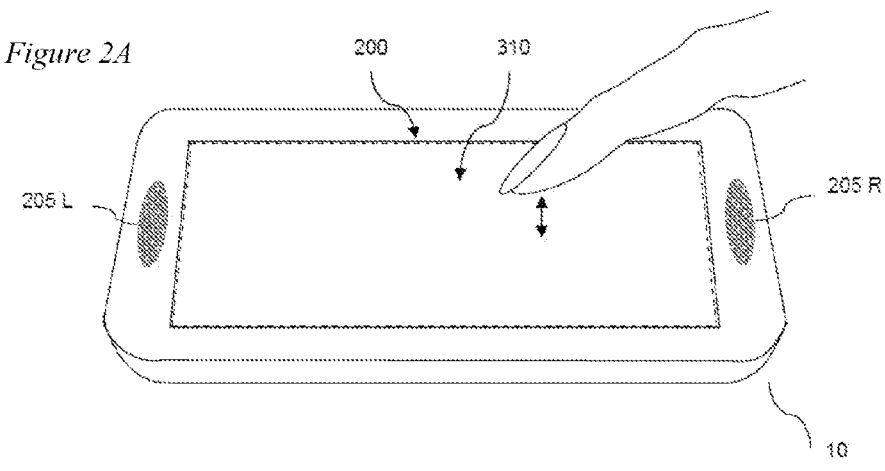
FIGS. 2 A-B are schematic diagrams of a portable entertainment device according to an embodiment of the present invention.
Figure 2B:
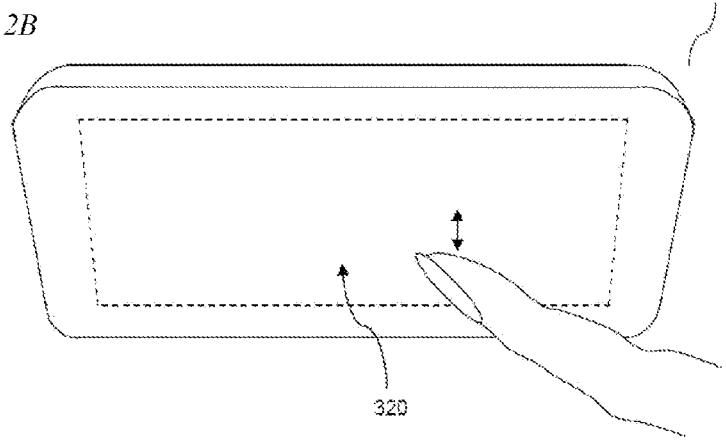

Referring now to FIGS. 2A and 2B, in an embodiment of the present invention a PSV 10 may act as the first entertainment device.

FIGS. 2A and 2B illustrate an embodiment of a PSV 10. FIG. 2A shows a notional front or top side of the PSV, whilst FIG. 2B shows a notional rear or bottom side of the PSV. The front and rear sides are substantially parallel to each other.

On the front side, the PSV comprises a display 200 and optionally one or more loudspeakers 205L, 205R. A transparent front touch sensitive surface 310 (indicated by the dotted lines) is also provided coincident with the display 200. On the rear side, the PSV comprises a rear touch sensitive surface 320 (indicated by the dotted lines) having similar dimensions to the display 200. The rear touch sensitive surface is positioned so as to be substantially aligned with the display along a central axis normal to the display. The front and rear touch sensitive surfaces and the display thus have similar dimensions and placements on their respective sides of the device. The touch sensitive surfaces also have a similar resolution of touch localisation and are multi-touch.

Figure 3:
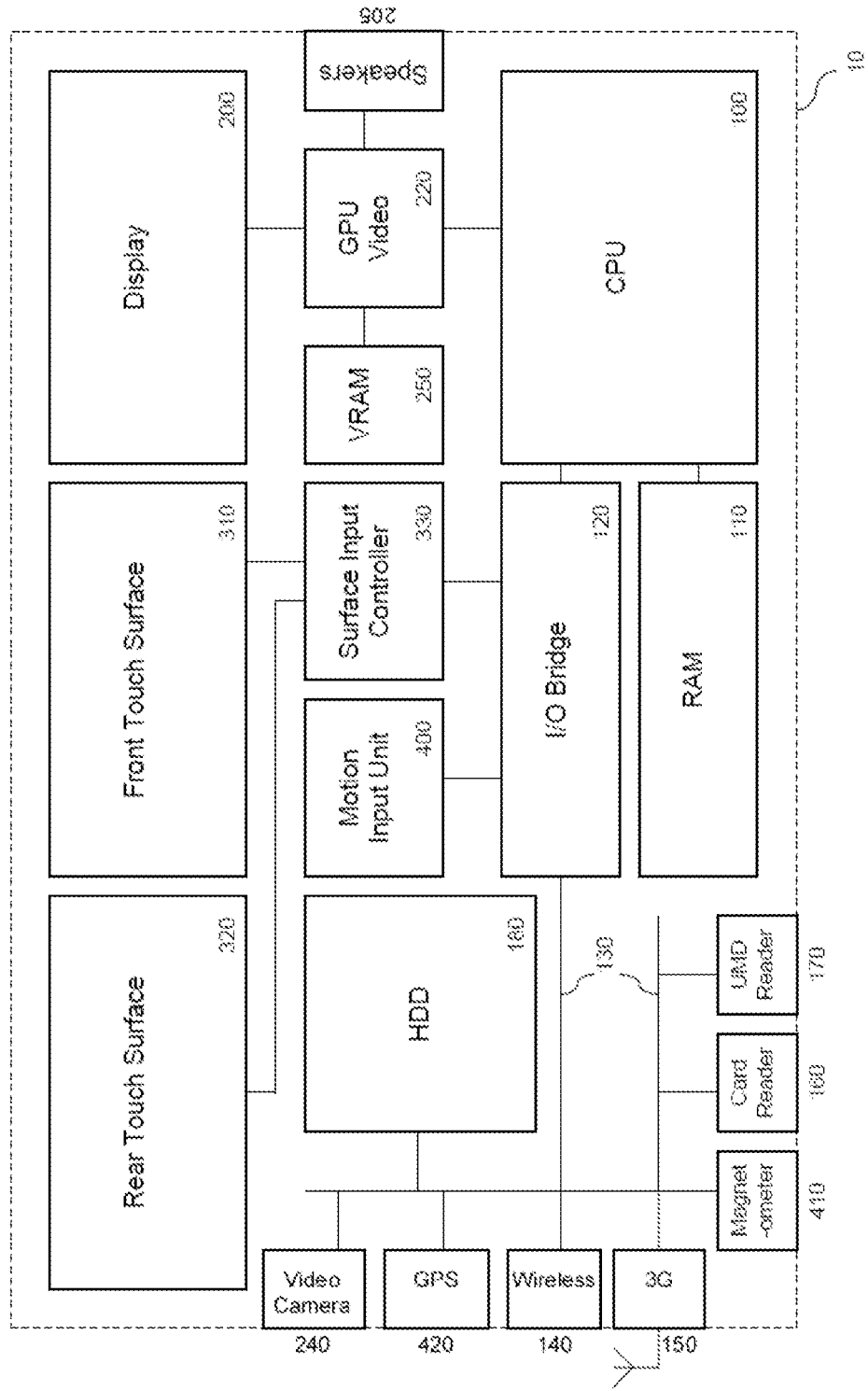
FIG. 3 is a schematic diagram of the portable entertainment device according to an embodiment of the present invention.

Referring now also to FIG. 3, The PSV comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205 and/or to a headphone jack (not shown). The GPU also outputs video information to the display 200. The display is typically a liquid crystal display (LCD) but may be an organic light emitting diode display (OLED) or similar suitable display technology.

In addition, the CPU communicates with an input/output bridge (I/O bridge) 120 that co-ordinates communication with peripheral components both integral to and linkable with the PSV. In an embodiment of the PSV the I/O bridge communicates with a surface input controller 330, which parses inputs from the rear touch sensitive surface and the transparent front touch sensitive surface. The I/O bridge also communicates with a motion input unit 400 comprising one or more micro electromechanical (MEMs) accelerometers and/or gyroscopes, to provide up to six axes of motion input (x, y and z axis lateral movement and roll, pitch and yaw rotational movement). Finally, the I/O bridge communicates with a bus 130, upon which various peripheral devices may be linked, including one or more wireless communication units 140, such as for example WiFi and/or Bluetooth®.

The CPU 100 is typically a multi core processor, such as the ARM® Cortex A9 quad core processor. Meanwhile, the RAM may be dynamic RAM or may comprise both dynamic RAM and static (flash) RAM units. Likewise, the GPU may have multiple cores, such as a quad core PowerVR graphics processor. Whilst the GPU typically uses dedicated VRAM, alternatively or in addition it may share common RAM with the CPU. Finally, it will be appreciated that the function of the surface input unit may be performed by the CPU itself.

It will be appreciated that whilst not shown in the figures for the purposes of clarity, the PSV comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Additionally, an embodiment of the PSV may comprise one or more additional components, either integrated within the device or connectable to it. The additional components include, but are not limited to, the following.

a) A card reader 160 suitable for reading from and optionally writing to memory cards, such as the Sony® Memory Stick®, or alternatively legacy memory cards such as those used by the Sony® Playstation 2® entertainment device. Such a reader may be integral to the PSV or connect to the bus 130 via a USB connection.

b) A universal media disk (UMD) reader 170 or other optical disk reader (such as DVD or Blu-Ray®), for accessing media and/or game content stored thereon. Such a reader may be removably connectable to the bus 130 via a USB or proprietary connection.

c) A magnetometer 410 for determining compass direction, mounted integral to the PSV either on the bus 130 or as part of the motion input unit 400.

d) A third generation (3G) or other mobile telephony module 150. In an embodiment, the module and aerial are integral to the PSV, and optionally the aerial is shared with or otherwise coupled electromagnetically with other wireless units in the device for the purpose of transmission and reception. Alternatively the module may be removably connectable to the PSV, for example via USB port or a personal computer memory card international association (PCMCIA) slot.

e) A hard disk drive (HDD) 180 integral to the PSV, providing bulk storage for audio/video media, downloaded games, and the like.

f) A GPS receiver 420. Again the GPS receiver may share an aerial with one or more other wireless units (such as WiFi) within the PSV. Map information, where used, may be stored locally at the receiver, or in flash RAM of the PSV, or on an HDD of the PSV.

g) A video camera 240, typically comprising a charge coupled device (CCD) optical sensor and suitable optics for imaging onto the CCD. The resolution of the CCD may for example be 640×480 pixels, but may be any suitable resolution, such as for example 1920×1080 pixels (full HD). In an embodiment the video camera is integral to the PSV, but alternatively may be removably connectable to the bus 130 via a USB or proprietary connection. An embodiment of the PSV comprises two such video cameras 240, forming a stereoscopic pair.

In operation, the CPU accesses an operating system that is resident for example on a ROM, flash RAM or a hard disk. The operating system co-ordinates operation of the various functions of the PSV and presents a user interface to a user of the device. The user interface will typically comprise graphical outputs via the display and touch based inputs, but may also include audio outputs and/or motion-based inputs.

The touch based inputs to the PSV are peculiar to the arrangement of a display on the front of the PSV and a correspondingly positioned touch sensitive surface (or 'panel') on the rear of the PSV. This allows the user to treat the rear panel as a proxy for the display (in other words, address actions and inputs to the rear touch panel as if to the display, and/or point to the panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy). Use of the rear touch panel as a proxy for the display advantageously allows interaction with the graphical output of the device without the user's hand or fingers obscuring the display or marking the display window.

In operation, the operating system or a game application running on the operating system implements those parts of the method described herein that relate to the portable electronic device.

Referring again to FIG. 1, the first player may be playing a game on the first entertainment device, and have become stuck. In an embodiment of the present invention, the entertainment devices' operating system, or the game software (either directly or via the operating system) respond to a user action to request help. This action may be to make a particular menu selection or press an assigned button, for example.

In response, the CPU of the entertainment device saves the user's current game state to memory (or alternatively accesses the most recent game state saved, either by the user or at a predetermined point in the game, such as just prior to encountering the present in-game challenge).

The first player then nominates a friend (the second player) to help them. This may be done by access to a friends list managed either by the private network provider (e.g. PSN) or, via an approved interface, by access to a third party friends list such as that on Facebook® or a similar social media website. Accompanying the nomination, the first player can include a message identifying what actions need to be taken or demonstrated by the friend to help them.

To qualify for nomination, the friend must have access to a second entertainment device 10A (for example another PS Vita), and this must be registered in such a manner (for example with the private network provider) that messages and data can be sent to it. For example, registration may involve use of a unique user ID and/or IP address that is then associated with the friend. When the friend logs on to the private network or third party website using their unique user ID, they can then receive the message asking if they would be prepared to assist the first player to overcome their current in-game challenge.

In a first instance, if they decline the request then a message is sent back to the first player informing them of this.

In a second instance, the friend accepts the request. In this instance, the friend's entertainment device 10A has a copy of the same game installed or otherwise accessible. In this case, an especially formatted save game is transferred to the friend's entertainment device. This save game may have been sent with the user's original request and stored on a server administering the friends list, or may be provided via a peer-to-peer or other suitable connection directly from the first players device. However, this latter arrangement requires both devices to be on-line at the same time, which may be difficult to arrange.

The especially formatted save game includes a flag or other indicator (for example a dedicated file extension) to indicate to the operating system and/or the game on the friend's entertainment device 10A that it is not a conventional save game and does not relate to the friend's own progress though the game (which may have conventional save games associated with it).

In particular, the especially formatted save game may comprise one or more limits on use. For example, the especially formatted save game may prevent the friend progressing past a predetermined subsequent point in the game. This point will have been selected by the game designer and may, for example be the next automatic save point that occurs after the current in-game challenge is completed. Alternatively or in addition the save game may specify any other suitable termination condition, such as the death of the strongest enemy currently active within the saved game state. For some games, this may provide a more flexible and open-ended means to encapsulate the action requested from the friend. The especially formatted save game may also have an expiry date, such as for example 3 days after receipt by the friend. It will be appreciated that 3 days is a non-limiting example. The especially formatted save game also comprises data associating it with the first player, such as the first player's user ID, or a nonce issued by the private network server that it associated at the server with the first player's user ID.

The OS or game on the friend's entertainment device can open the especially formatted save game and import the first player's game state from it, to start the game from the first player's save point and with all the first player's settings and game history (for example the first player may have collected objects and weapons or acquired ability and skill points in the game that are different to those acquired by the friend whilst playing the game for themselves). The friend can then attempt to overcome the challenge presented by the game as requested by the first player in their message.

In response to the especially formatted save game, the OS or game causes the game to operate in a gamer assist mode, where the actions of the friend are recorded for the benefit of the first player. This recording may take the form of a video capture of the displayed action, or more efficiently a capture of all the relevant input controls operated by the friend (thus for example, if the game does not use SIX-AXIS motion inputs, then there would be no need to record motion data).

The friend may need to make a number of attempts to overcome the challenge themselves, particularly if the first player's game state is significantly different to their own. In this case, previous recordings are discarded in favour of the current attempt.

Optionally, if the friend overcomes the challenge and this is recognised by reaching a termination condition or save point, the recording made of that successful attempt may be stored even if the friend attempts the challenge again (for example if they want to do it better). In this way, if the friend fails on subsequent occasions then there is still an adequate record to assist the first player.

Once the friend has overcome the challenge and either signals their satisfaction with their performance or an expiry limit on the especially formatted save game is reached, the friend's device uploads an updated version of the especially formatted save game back to the server administering the private network, using the first player's ID or nonce it identify to whom the updated version should be returned. Alternatively, the updated version of the especially formatted save game could be directly sent to the device of the first player via a peer to peer link.

The updated version of the especially formatted save game optionally includes the original game state sent to the friend (in case it has subsequently been deleted from the first player's entertainment device) and also contains the recording of the friend's actions.

In a third instance, the friend receiving the request to help does not have a copy of the game themselves. In this case, optionally the server administering the private network, or a third party server of the game providers, can supply to the friend's entertainment device the minimum required game code needed to perform the requested task.

To do this, the especially formatted save game may include IP addresses or web links to the game provider that can be used by the friend's entertainment device, and this device sends some or all of the especially formatted save game to a server at the specified address or link. The server analyses the save game to confirm legitimacy and to detect what part of the game needs to be played. The server may then provide the friend's entertainment device with the resources needed to play that part of the game. This may be as little as the core game engine and the audio-visual assets for the portion of the game specified by the especially formatted save game, or may be the core game engine and a predefined portion of the game assets that encompasses the portion of the game specified by the especially formatted save game. Similarly it may be a full version of the game locked into a gamer assist mode and hence only able to play game sections specified by especially formatted save games. Again such a download may have an associated expiry date, which may be set to coincide with that of the especially formatted save game if it has one too.

Once the friend has the game installed on their entertainment device, the system operates in a similar manner to the second instance above. Consequently where the friend is successful in overcoming the challenge on behalf of the first player, an updated version of the especially formatted save game is again produced.

The entertainment device of the first player then receives the updated version of the especially formatted save game, either directly from the friend's device via a peer-to-peer link, or via the private network when they are logged in with their unique ID.

The updated version of the especially formatted save game includes a flag or other indicator (for example a dedicated file extension) to indicate to the operating system and/or the game on the friend's entertainment device 10A that it is not a conventional save game and moreover that it is not an initial especially formatted save game.

Upon receiving the updated version of the especially formatted save game, the entertainment device of the first player generates a notification message for the user, allowing the user to decide whether they want to use the updated version of the especially formatted save game received from their friend. This notification may be implemented by the OS (for example upon log-on and synchronisation with the private network) or by the game (for example upon starting the game).

In a first instance, the first player has managed for themselves to overcome the in-game challenge in the meantime and so may not wish to use the updated version of the especially formatted save game. In this case, the updated version of the especially formatted save game is deleted from the entertainment device. Optionally, the first player may be provided with the opportunity to thank their friend by sending a message to them. The friend may be identified from data within the updated version of the especially formatted save game, or by comparing identification data within the updated version of the especially formatted save game with identification data within the originally sent especially formatted save game and/or request.

In a second instance, the first player indicates their wish to use the updated version of the especially formatted save game. In response to the updated version of the especially formatted save game, the OS or game causes the game or OS to operate in a gamer teaching mode.

If the updated version of the especially formatted save game contains a video recording of the friend's play, then in gamer teaching mode either the OS or the game then play this recording back for the user to watch. Consequently the first player may then replicate the friend's play. Optionally, the updated version of the especially formatted save game also contains a save of the new game state after completion of the challenge by the friend (e.g. at the point of the termination condition). Therefore if the user still can't replicate their friend's play for themselves, they can bypass the challenge by selecting this new game state. Notably, because the new game state was based upon the friend playing the game using the first player's original game state, the new game state remains wholly consistent for the first player (for example, they retain all their objects, experience points, game branches or the like, which may be unique to their previous play of the game to this point).

Alternatively, if the updated version of the especially formatted save game contains a recording of the friend's control inputs to the game, then in gamer teaching mode either the OS or the game can parse these recorded inputs and supply them to the game, starting from the game state found in the original especially formatted save game (or optionally a copy of that original game state found in the updated version, as described previously). The recording includes both the inputs themselves and their timings, so that a precise recreation of the friend's game play can be generated. In this way, the game operates as if it were being controlled in a conventional manner, but receives the recorded inputs made by the friend instead of live inputs from the first player.

This has several advantages over the use of a video recording.

Firstly, in general the resolution and overall image quality of a game will be noticeably better than that of a compressed video capture of that game. As a result it is much clearer to watch, which may be critical to an understanding of the friend's actions in overcoming the challenge.

Similarly, because the friend's actions are being replicated within the game, then if the game provides the feature of multiple viewpoints or a controllable camera, the first player may be able to change viewpoints whilst the recorded play occurs, again providing the first player with the means to watch their friend's actions from several angles in order to aid comprehension.

Thirdly, the recorded inputs will generally result in a much smaller file size than an equivalent video, making uploading, storage and downloading all faster.

Finally, because the game or the OS is parsing the friend's recorded inputs and presenting them to the game (or specifically the input handling part of the game), it is possible to switch seamlessly from the recorded inputs of the friend to live inputs from the first player. In this case, the game (or the OS) scans for inputs from the first player's controller. In response to a predetermined input from the first player's controller, the recorded inputs from the friend's updated version of the especially formatted save game are suspended and inputs from the first player's controller are used instead.

The predetermined input may be a specific button used to indicate a wish to resume play, or may be any of the game's normal control buttons, so that the moment the first player starts to issue game control commands, these are obeyed by the game.

The effect is that the first player can take over from their friend's recorded efforts whenever they wish. Consequently they can resume control of the game as soon as they feel confident that they are able to proceed. Indeed, if they choose to re-play the friend's recorded inputs, they can try to intervene at progressively earlier stages so that they practise more and more of the challenge, until (perhaps) they manage to overcome it themselves.

In short, it gives the first player the ability to play as much of the game as they can, which is important to their sense of satisfaction and investment in the game.

Once the first player has overcome the in game challenge (either themselves, or partially in conjunction with recorded inputs from their friend, or by letting their friend's recorded inputs overcome the game challenge for them), then at the next conventional save point (or when the first player next chooses to save the game) they can be given the option to delete the updated version of the especially formatted save game.

Hence the above arrangement enables a friend to assist a first player, by playing the first player's single-player game as if they are the first player (i.e. using the game state specific to the first player) by use of especially formatted save games to transfer the first player's game state to the friend, and upon completion of the in-game challenge, to transfer the updated first player's game state back to the first player. This allows a second player (the friend) to intervene on the first user's behalf without interrupting the continuity of the first player's game state.

The above arrangement achieves this in the case where the video game is hosted respectively on the first player's and friend's devices (i.e. local or client-side game hosting). However, the same principle can be applied for server-side game hosting, otherwise known as 'cloud gaming'.

In cloud gaming, high performance gaming systems are hosted by a service provider, and these generate a video output of the game. This output is streamed to the player of the game. Meanwhile, inputs to control the game are uploaded back to the service provider, which routes them to the appropriate high performance gaming system so that the user can interact with the game.

An advantage of this arrangement is that in principle the player can play a high performance game on almost any device capable of receiving streaming video over the internet, such as a web-enabled TV or set-top box, or a mobile phone or other such device. As a result it is possible to play games on devices that themselves do not have the computing or graphics power to play them directly.

Typically the cloud gaming service provider gives each player an account with a unique ID, so that their respective game states can be saved between play sessions.

Figure 4:
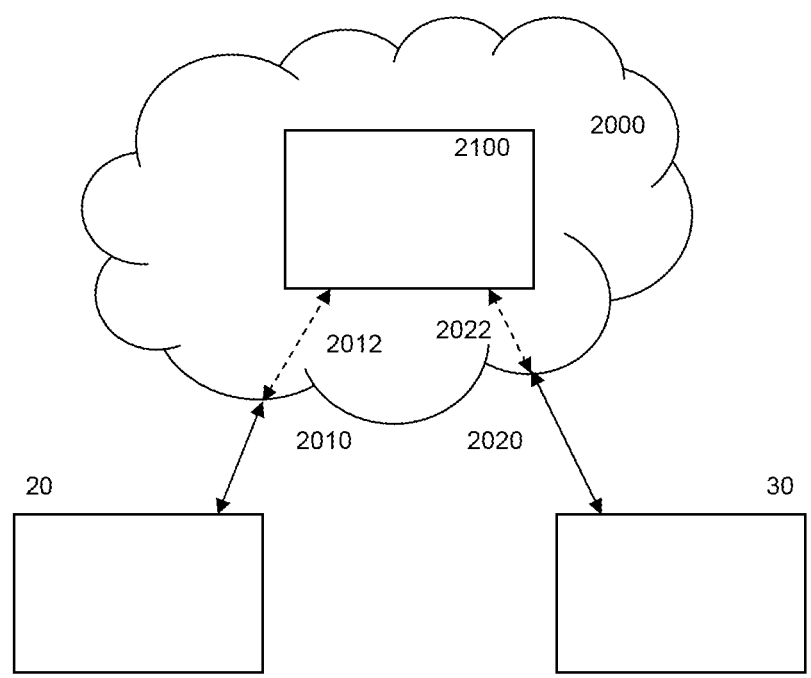
FIG. 4 is a schematic diagram of a cloud gaming system according to an embodiment of the present invention.

Referring now to FIG. 4, in an embodiment of the present invention, the gamer assist system works in a similar fashion to that described above for the case where a first player and their friend host the game on their respective local devices. The primary difference is that instead the game is hosted on one or more high performance gaming systems 2100 of the cloud gaming service provider 2000. The first player and the friend can use whatever respective client devices (20, 30) they have that are operable with the cloud gaming service.

In this embodiment, again the first player can nominate their friend to help them overcome an in-game challenge, resulting in an invitation message being sent to the friend requesting help with the particular in-game challenge in a similar manner to that previously described. At this point, in a similar manner to that described previously, an especially formatted save game is created that captures the first player's game state.

The message to the friend can be internal to the cloud gaming system (e.g. being presented upon login to the cloud gaming service in a manner analogous to logging on to the personal network as described previously). Alternatively the message may be external (for example via email or a social network such as Facebook®) and contain a link enabling the friend to join the cloud gaming service. Where the friend does not already have an account with the cloud gaming service provider, this link may assist with the creation of such an account. The account may be initially limited to fulfilling the role of assisting the first player, or may also provide credits or other means to play the game (or other games) for a predetermined period as a reward for helping the first player.

Once the friend has an account, then in a similar manner to that described previously, an especially formatted save game can be copied from the first player's account to the friends' account (or, if supported by the service provider, the especially formatted save game can simply be associated with both people so that either can access it).

If the friend opens the game with the especially formatted save game then they can play in gamer assist mode as described previously, and their efforts can be recorded either as video or as a sequence of inputs to the game. The friend's recorded efforts, if successful according to some termination criterion as described previously, are included in an updated version of the especially formatted save game that is then made accessible to the first player. The first player can then watch and/or interact with a playback of the recorded data as described previously in order to overcome the in-game challenge. Again the updated version of the especially formatted save game can also include a save game of the game state upon completion of the in-game challenge to enable the first player to bypass the challenge entirely if they want.

In this way, the game and/or OS can be coded to operate similarly for either a local implementation or a cloud implementation, as the differences are in how the first player and friend are contacted and how versions of the especially formatted save game are exchanged. These differences can be made transparent to the relevant parts of the game or OS that handle them in accordance with embodiments of the present invention.

Again, the friend serves to play as if they were the first player, based upon the first player's saved game state.

In another embodiment, the first user and the friend are both logged into the cloud gaming service at the same time. The first player plays their game by receiving a video feed (via link 2010) from the cloud gaming service that is generated by a respective high performance gaming system running the first player's instance of the game, and by inputting game controls to the device they are using the play the game, with these inputs being sent to the cloud gaming service and routed (route 2012) on to that respective high performance gaming system.

In this case, again the first player can nominate their friend to help them overcome an in-game challenge. This again can take the form of a message to the friend. If the friend accepts, then (if necessary) their own gaming progress is saved and/or suspended.

Subsequently, the video feed from the first player's instance of the game can also be sent to the friend (link 2020), so that both the first player and the friend can see the first player's instance of the game. In addition, inputs from the first player are either not routed to the respective high performance gaming system or not used by it, whilst inputs from the friend are (route 2022). In this way, control of the first player's game in the cloud gaming system is passed to the friend, whilst also allowing the first player to watch.

Consequently again the friend inherits the first player's game state and plays as if they are the first player.

In a similar manner to that described previously, termination conditions are used similar to those of the especially formatted save game described previously. Again the termination conditions may include one or more of a time period (as a non-limiting example 10 minutes), and/or reaching a predetermined waypoint or save point in the game, (for example the next save point or game map loading point to occur after the current in-game challenge), and/or killing the largest current enemy, or reaching a qualifying race time, or any other relevant achievement.

Once a termination condition has been met, control is reverted back to the first player. Optionally, the first player may also select to re-take control of the game at any time (for example by pressing a predetermined button or selecting a menu option) in a similar manner to that described above for taking over from a friends' recorded inputs.

Optionally, in this embodiment, the first player and the friend may also be provided with chat, voice and/or video links to each other. Optionally, the points of handover from the first player to the friend, and back, may automatically put the game in pause mode to enable the new player to prepare themselves.

Figure 5:
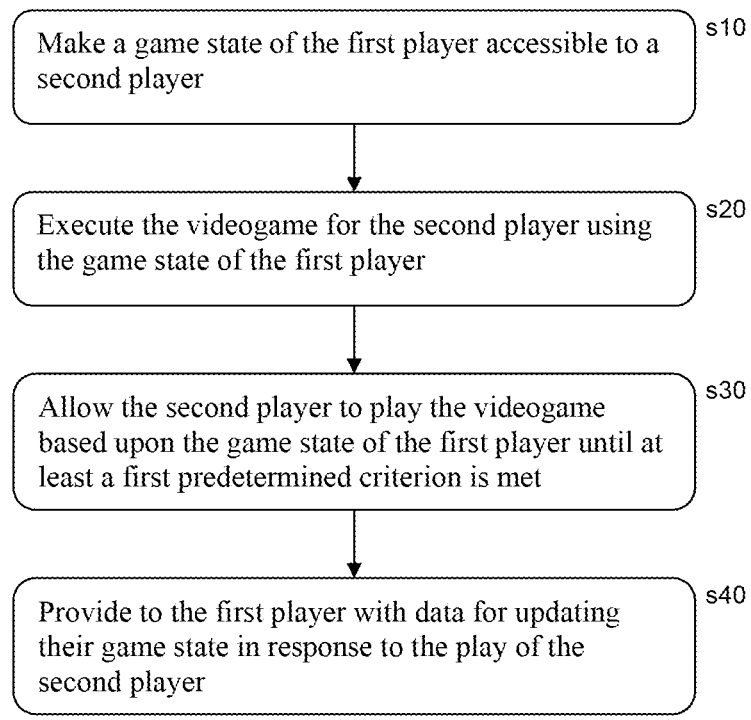
FIG. 5 is flow diagram of a method of assisting a first player of a videogame according to an embodiment of the present invention.

Referring now to FIG. 5, a method of assisting a first player of a videogame on a first device comprises:

in a first step s10, making a game state of the first player accessible to a second player, the game state describing a state of the videogame as played by the first player;

in a second step s20, executing the videogame for the second player on a second device using the game state of the first player to define the initial state of the videogame for the second player;

in a third step s30, allowing the second player to play the videogame based upon the game state of the first player until at least a first predetermined criterion is met; and in a fourth step, providing to the first player with data for updating their game state in response to the play of the second player.

It will be appreciated that the order of the above steps may be different or concurrent according to various embodiments as described herein.

It will be apparent to a person skilled in the art that variations in the above method corresponding to operation of the various embodiments of the apparatus as described and claimed herein are considered within the scope of the present invention, including but not limited to:

In the first step, making a game state of the first player accessible to a second player by sending an especially formatted save game to the second device of the second player.

In the second step, executing the videogame on the second device of the second player in a predetermined mode responsive to the especially formatted save game;

In the third step, allowing the second player to play the video game based upon the game state of the first player until one or more criteria are met, selected from the list consisting of:
  i. a time limit;
  ii. a limit on the number of attempts made on a game challenge; and
  iii. triggering a predetermined event in the videogame (such as reaching a save point, map reload point, or finish line, or killing a particular enemy).

In the third step, recording the actions of the second player and retaining the recording if they trigger a predetermined event or meet a predetermined criterion, the recording being a video of the second player's play and/or a record of inputs by the second player to the videogame.

In the fourth step, providing the first player with data for updating their game by providing an updated especially formatted save game comprising a recording of the second player's inputs during play of the video game, the recording being a video and/or a record of inputs by the second player to the videogame.

In the fourth step, providing the first player with data for updating their game by providing an updated especially formatted save game comprising a save of an updated version of the first player's game state, for example saved when the first predetermined criterion is met.

Correspondingly, in a summary embodiment of the present invention, an entertainment device for playing a videogame by a first player comprises a network interface connectable to a network, wherein the entertainment device is operable to transmit via the network interface a game play assistance request. The entertainment device is operable to transmit via the network interface an especially formatted save game describing a state of the videogame as played by the first player, and the entertainment device is operable to receive via the network interface an updated version of the especially formatted save game describing a state of the videogame as subsequently played by a second player.

Meanwhile, an entertainment device for playing a videogame by a second player comprises a network interface connectable to a network, wherein the entertainment device is operable to receive via the network interface an especially formatted save game describing a state of the videogame as played by a first player. The entertainment device is operable to execute the videogame for the second player using the game state of the first player to define the initial state of the videogame for the second player and is operable to detect whether a first predetermined criterion is met during this execution of the video game. Finally, the entertainment device is operable to transmit via the network interface an updated version of the especially formatted save game describing a state of the videogame as played by the a second player, if the first predetermined criterion is met.

In a cloud gaming application, similarly in a summary embodiment a cloud gaming server comprises a game administration processor operable to make a game state of a first player accessible to a second player, the game state describing a state of a videogame as played by the first player, and a game processor operable to execute the videogame for the second player using the game state of the first player to define the initial state of the videogame for the second player. The game administration processor is operable to allow the second player to play the videogame based upon the game state of the first player until a first predetermined criterion is met, and is operable to make a version of the game state accessible to the first player that has been updated in response to the play of the second player. In this case, it will be appreciated that the administration processor and game processor may be the same processor, or may be distributed over two or more processors of a cloud server using virtualization.

Consequently, it will be appreciated that the methods disclosed herein may be carried out on conventional hardware suitably adapted as applicable by software instruction, or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device, or separately as transmitted via data signals on a network such as an Ethernet, a wireless network, the Internet, or any combination of these of other networks.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A method of assisting a first player of a videogame on a first device, comprising the steps of:
    making a game state of the first player accessible to a second device of a second player, the game state describing a state of the videogame as played by the first player on the first device, in which making the game state of the first player accessible to the second player comprises providing an especially formatted save game to the second device of the second player;
    executing, by one or more processors of the second device, the videogame for the second player in accordance with the especially formatted save game, using the game state of the first player to define an initial state of the videogame for the second player, the initial state corresponding to a save point of the game state of the first player, the especially formatted save game including an indicator identifying to the second device that the especially formatted save game is not a conventional save game and does not relate to progress of the second player though the videogame, the especially formatted save game further including data associating the especially formatted save game with the first player;
    allowing the second player to play the videogame on the second device on behalf of the first player in a game assist mode as if the second player is the first player, based upon the save point of the game state of the first player, until a first predetermined criterion is met; and
    providing, to a communication unit of the first device of the first player, data for updating the game state of the first player in response to the play of the second player on the second device and in accordance with the data associating the especially formatted save game with the first player.

2. A method according to claim 1, in which the step of executing the videogame for the second player comprises executing the videogame on the second device of the second player in a predetermined mode responsive to the especially formatted save game.

3. A method according to claim 1, in which the step of allowing the second player to play the videogame based upon the game state of the first player comprises the steps of:
    recording actions of the second player; and
    retaining the recording if the actions trigger a predetermined event, wherein the recording is a video of the second player's play.

4. A method according claim 3, in which the step of providing to the first player data for updating the game state of the first player comprises providing an updated especially formatted save game comprising the recording.

5. A method according to claim 1, in which the step of allowing the second player to play the videogame based upon the game state of the first player comprises the steps of:
    recording actions of the second player; and
    retaining the recording if the actions trigger a predetermined event, wherein the recording comprises a record of inputs by the second player to the videogame.

6. A method according claim 5, in which the step of providing to the first player data for updating the game state of the first player comprises providing an updated especially formatted save game comprising the recording.

7. A method according to claim 1, in which the step of providing to the first player data for updating the game state of the first player comprises providing an updated especially formatted save game comprising a save of an updated version of the first player's game state, saved when the first predetermined criterion is met.

8. The method of claim 1, in which the first device and the second device are registered with a common network provider.

9. The method of claim 1, wherein, prior to making the game state of the first player accessible to the second player, the second player was nominated in accordance with a player request via a computer network to assist the first player in overcoming a game play obstacle occurring at the initial state of the videogame.

10. The method of claim 1, wherein data associating the especially formatted save game with the first player comprises either a user ID of the first player or a nonce that associates the especially formatted save game with the user ID of the first player.

11. The method of claim 1, wherein the first predetermined criterion comprises a usage limit including one or more of:
    a progress limitation;
    a termination condition; and
    an expiration condition.

12. A non-transitory computer program product storing computer program instructions therein, the instructions, when executed by a processor, cause the processor to implement a method comprising the steps of:
    making a game state of a first player of a videogame using a first device accessible to second device of a second player, the game state describing a state of the videogame as played by the first player on the first device, in which making the game state of the first player accessible to the second player comprises providing an especially formatted save game to the second device of the second player;
    executing the videogame for the second player on the second device in accordance with the especially formatted save game, using the game state of the first player to define an initial state of the videogame for the second player, the initial state corresponding to a save point of the game state of the first player, the especially formatted save game including an indicator identifying to the second device that the especially formatted save game is not a conventional save game and does not relate to progress of the second player though the videogame, the especially formatted save game further including data associating the especially formatted save game with the first player;
    allowing the second player to play the videogame on the second device on behalf of the first player in a game assist mode as if the second player is the first player, based upon the save point of the game state of the first player, until a first predetermined criterion is met; and providing, to the first device of the first player, data for updating the game state of the first player in response to the play of the second player on the second device and in accordance with the data associating the especially formatted save game with the first player.

13. An entertainment device for playing a videogame by a first player, comprising:
one or more processors configured to execute the videogame; and
a network interface connectable to a network and operatively coupled to the one or more processors;
wherein:
the entertainment device of the first player is operable to transmit, via the network interface, a game play assistance request to an entertainment device of a second player;
the entertainment device of the first player is operable to transmit to the entertainment device of the second player, via the network interface, an especially formatted save game describing a state of the videogame as played by the first player, the state of the videogame corresponding to a save point of a game state of the first player,
the especially formatted save game comprising an indicator identifying to the entertainment device of the second player that the especially formatted save game is not a conventional save game and does not relate to progress of the second player though the videogame, the especially formatted save game further comprising data to enable the second player to continue play of the videogame on the entertainment device of the second player on behalf of the first player in a game assist mode as if the second player is the first player, based on the save point of the game state of the first player; and
the entertainment device of the first player is operable to receive, via the network interface, an updated version of the especially formatted save game describing a state of the videogame as subsequently played on the entertainment device of the second player.

14. An entertainment device for playing a videogame by a second player, comprising:
one or more processors configured to execute the videogame; and
a network interface connectable to a network and operatively coupled to the one or more processors;
wherein:
the entertainment device of the second player is operable to receive, via the network interface, an especially formatted save game describing a state of the videogame as played on another entertainment device by a first player, the state of the videogame corresponding to a save point of a game state of the first player,
the especially formatted save game comprising an indicator identifying to the entertainment device of the second player that the especially formatted save game is not a conventional save game and does not relate to progress of the second player though the videogame, the especially formatted save game further comprising data to enable the second player to continue play of the videogame on the entertainment device of the second player on behalf of the first player in a game assist mode as if the second player is the first player, based on the save point of the game state of the first player;
the entertainment device of the second player is operable to execute, by the one or more processors, the videogame for the second player in accordance with the especially formatted save game, using the game state of the first player to define an initial state of the videogame for the second player, the initial state corresponding to a save point of the game state of the first player, the especially formatted save game including an indicator identifying to entertainment device of the second player that the especially formatted save game is not a conventional save game and does not relate to progress of the second player though the videogame, the especially formatted save game further including data associating the especially formatted save game with the first player, wherein using the game state of the first player enables the second player to continue play, on the entertainment device of the second player, on behalf of the first player in a game assist mode as if the second player is the first player;
the entertainment device of the second player is operable to detect whether a first predetermined criterion is met during the execution of the video game on the entertainment device of the second player; and
the entertainment device of the second player is operable to transmit, via the network interface, an updated version of the especially formatted save game describing a state of the videogame as played on the entertainment device by the second player, if the first predetermined criterion is met.

* * * * *